No. 614,252. Patented Nov. 15, 1898.
L. MAYHEW.
DEVICE FOR CUTTING SHEET METAL.
(Application filed Mar. 19, 1897.)
(No Model.)
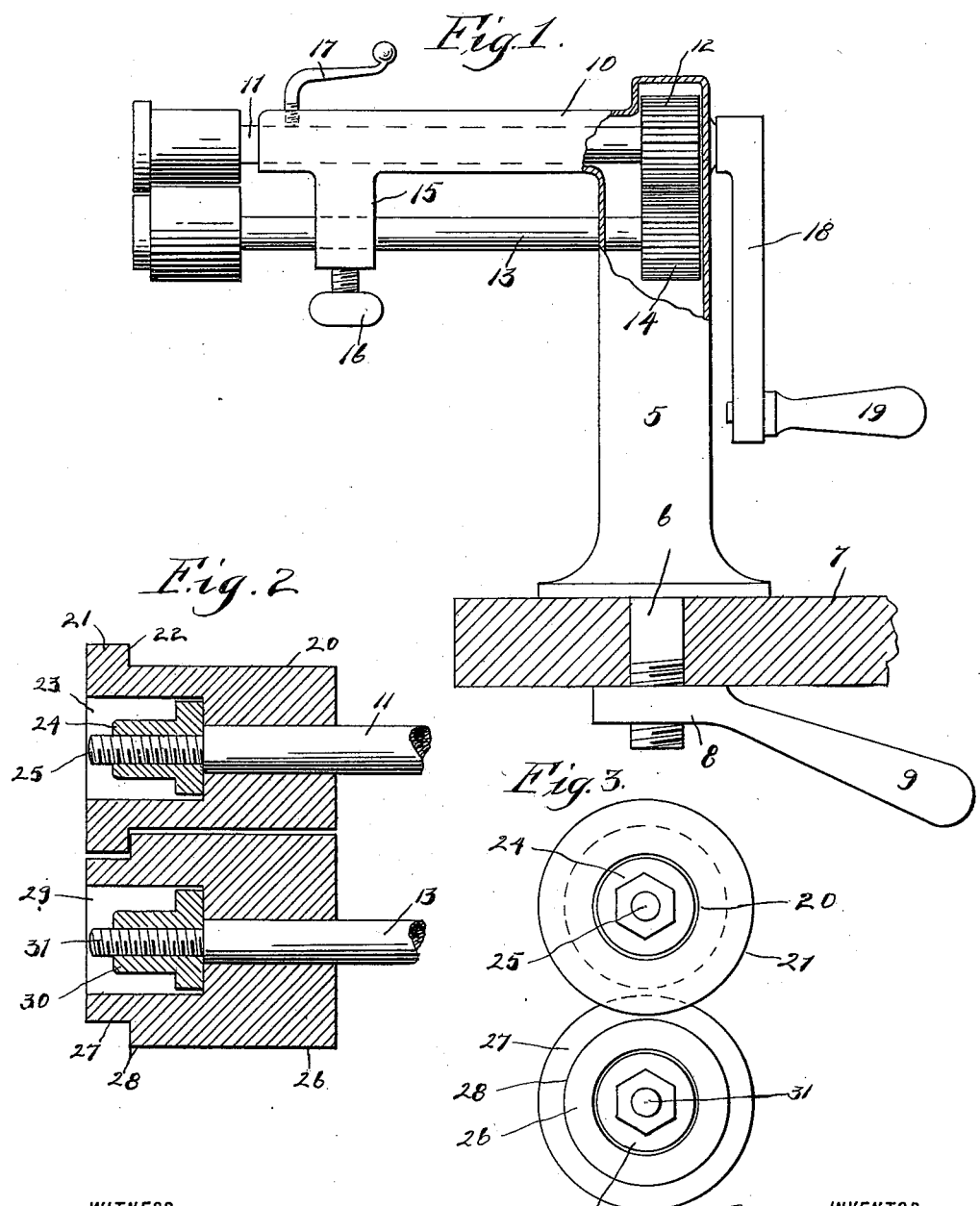
WITNESS
INVENTOR
Lewis Mayhew
BY Edgar Tate & Co
ATTORNEYS.
THE NORRIS PETERS CO., PHOTO-LITHO., WASHINGTON, D. C.

UNITED STATES PATENT OFFICE.

LEWIS MAYHEW, OF NEW WHATCOM, WASHINGTON.

DEVICE FOR CUTTING SHEET METAL.

SPECIFICATION forming part of Letters Patent No. 614,252, dated November 15, 1898.

Application filed March 19, 1897. Serial No. 628,276. (No model.)

*To all whom it may concern:*

Be it known that I, LEWIS MAYHEW, a citizen of the United States, residing at New Whatcom, in the county of Whatcom and State of Washington, have invented certain new and useful Improvements in Devices for Cutting Sheet Metal, of which the following is a full and complete specification, such as will enable those skilled in the art to which it appertains to make and use the same.

This invention relates to metal-cutting devices, and particularly to devices of this class which are designed to be used in connection with swaging-machines; and the object of the invention is to provide an improved device of this class which is simple in construction and operation and by means of which sheet metal may be cleanly cut in strips of any desired width or in any preferred form, so as to form various kinds of vessels, receptacles, or tubing.

The invention is fully disclosed in the following specification, of which the accompanying drawings form a part, in which I have shown my improvement applied independently of a swaging-machine, but which, as hereinafter appears, may be employed in connection with machines of this class.

In the drawings forming part of this specification the separate parts of my improvement are designated by the same numerals of reference in each of the views, and in said drawings—

Figure 1 is a sectional side view of my improvement, showing the same connected with a table or other support; Fig. 2, a sectional side view of the cutters proper, and Fig. 3 an end view thereof.

In the practice of my invention, as shown in the drawings, I provide a standard or support 5, the lower end of which is provided with a screw-threaded shank 6, which is adapted to be passed through a table or other support 7 and on the lower end of which is placed a crank-nut 8, provided with a crank or handle 9. The upper end of the standard 7 is provided with a hollow or tubular arm 10, which projects at right angles thereto, and through said arm 10 is passed a shaft 11, which may be provided with any suitable bearings, and the end of said shaft within the upper portion of the standard 5 is provided with a gear-wheel 12, and mounted below the arm 10 is a supplemental shaft 13, which passes into the end of the standard 5 and is provided with a gear-wheel 14, which operates in connection with the gear-wheel 12 on the shaft 11, and the arm 10 is provided with a depending extension 15, through which the shaft 13 passes. A set-screw 16 passes through the extension 15, so as to tighten the bearings of the shaft 13, and a corresponding screw-lever 17 is connected with the outer end of the arm 10 for tightening the bearings of the shaft 11. The bearings of each of these shafts 11 and 13 may be of any desired form and construction and form no part of this invention and are therefore not shown and described, and that end of the shaft 11 which is provided with the gear-wheel 12 is also provided with a crank 18, to which is secured a handle 19.

The outer end of the shaft 11 is provided with a cylindrical head 20, on which is formed an annular flange or rim 21, which is provided with a sharp edge 22, and formed in the outer end of the head 20 is a circular chamber 23, and I also provide a nut 24, by which said head 20 is held on the shaft 11, said shaft being provided with a screw-threaded extension 25, which is adapted to receive said nut. The shaft 13 is also provided with a cylindrical head 26, in the outer end of which is formed an annular recess 27, which is similar in form to the annular flange or rim 21 on the head 20, and said head 26 is provided with a sharp annular edge 28, and formed therein is a cavity or recess 29, adapted to receive a nut 30, by means of which the head 26 is held on the shaft 13, said shaft 13 being also provided with a screw-threaded extension 31 for this purpose.

The body portions of the cylindrical heads 20 and 26 may be of any desired length, and in order to cut a sheet of metal said sheet is passed between said heads, which fit together and operate in the manner of cutting-rollers, and the sharp edge 22 on the annular flange or rim 21 of the head 20 operates, in connection with the sharp annular edge 28 on the head 26, to cut the metal, as will be readily understood.

It will be apparent that by means of this device strips of sheet metal of any desired width may be cut, and it will also be apparent that the cutting-heads 20 and 26 may be of any desired diameter as well as of any desired length, and my invention is not limited to the means for operating the shafts 11 and 13 herein shown and described nor to the means for supporting the same, the only object in this connection being to provide suitable supports for the shafts 11 and 13 and means for operating said shafts. It will also be apparent that the shafts 11 and 13 revolve in opposite directions and the cutting-heads 20 and 26 are rigidly secured to their respective shafts.

Having fully described my invention, I claim as new and desire to secure by Letters Patent—

An improved machine of the class described for cutting sheet metal, comprising a hollow or tubular standard or upright provided with a forwardly-projecting tubular arm at its top and with an extension projecting downwardly from said arm, a shaft mounted in the standard and extending through said tubular top arm with its end projecting therefrom, a shaft mounted in the standard in parallel relation to and beneath said first shaft and having a bearing in the downwardly-extending projection from the tubular top arm of the standard, said shafts having relatively-arranged projecting ends extending beyond their bearings, intermeshing gear mechanism inclosed within the tubular or hollow standard or upright and carried by the respective shafts, means exteriorly arranged with respect to said standard or upright for operating said gear mechanism, set devices respectively carried by the tubular top arm of the standard and by the downwardly-extending projection from said top arm for adjusting the bearings of the respective shafts, and cutter-heads arranged in relatively parallel position and respectively upon the projecting ends of the shafts and provided with relatively operating edges or cutters, the outer ends of said cutter-heads being provided with a recess or chamber receiving the projecting end of the shaft, and a securing device carried upon said end of the shaft within said recess or chamber, substantially as and for the purpose set forth.

In testimony that I claim the foregoing as my invention I have signed my name, in presence of the subscribing witnesses, this 6th day of March, 1897.

LEWIS MAYHEW.

Witnesses:
L. H. BALDY,
N. SAMSON.